(12) United States Patent
Seo et al.

(10) Patent No.: US 12,229,375 B1
(45) Date of Patent: Feb. 18, 2025

(54) PRESSURE TOUCH SENSING USING CONDUCTIVE PADS OF THE SAME PROPERTIES

(71) Applicant: ABOV Semiconductor Co., Ltd., Cheongju-si (KR)

(72) Inventors: Youngjin Seo, Seoul (KR); Seohan Lee, Seoul (KR); Dongsik Min, Yongin-si (KR); Jeonghwan Seo, Anyang-si (KR)

(73) Assignee: ABOV Semiconductor Co., Ltd., Cheongju-si (KR)

( * ) Notice: Subject to any disclaimer, the term of this patent is extended or adjusted under 35 U.S.C. 154(b) by 0 days.

(21) Appl. No.: 18/533,925

(22) Filed: Dec. 8, 2023

(51) Int. Cl.
*G06F 3/044* (2006.01)
*G06F 3/041* (2006.01)

(52) U.S. Cl.
CPC .......... *G06F 3/0445* (2019.05); *G06F 3/0414* (2013.01); *G06F 3/04182* (2019.05); *G06F 2203/04105* (2013.01); *G06F 2203/04107* (2013.01)

(58) Field of Classification Search
CPC .. G06F 3/0445; G06F 3/0414; G06F 3/04182; G06F 2203/04105; G06F 2203/041
See application file for complete search history.

(56) References Cited

U.S. PATENT DOCUMENTS

| | | | |
|---|---|---|---|
| 2017/0199624 A1 | 7/2017 | Nathan et al. | |
| 2017/0315662 A1* | 11/2017 | Reynolds | G06F 3/0412 |
| 2018/0292930 A1* | 10/2018 | Lee | G06F 3/0443 |
| 2019/0220115 A1* | 7/2019 | Mori | G06F 3/0446 |
| 2019/0354228 A1* | 11/2019 | Lai | G06F 3/04164 |
| 2021/0157439 A1* | 5/2021 | Lin | G06F 3/044 |
| 2024/0077968 A1* | 3/2024 | Sun | G06F 3/0414 |

FOREIGN PATENT DOCUMENTS

| | | |
|---|---|---|
| JP | 2019-179369 A | 10/2019 |
| KR | 2010-0092802 A | 8/2010 |
| KR | 2016-0048966 A | 5/2016 |
| KR | 10-1742052 B1 | 6/2017 |
| KR | 2018-0036469 A | 4/2018 |
| KR | 2018-0090292 A | 8/2018 |
| KR | 2019-0022324 A | 3/2019 |
| WO | WO 2015053343 A1 | 4/2015 |

* cited by examiner

*Primary Examiner* — Rodney Amadiz
(74) *Attorney, Agent, or Firm* — WTA Patents

(57) ABSTRACT

Disclosed is an improved pressure touch sensing method and device that can sense touch and pressure using a plurality of conductive pads having the same properties and not requiring separate machining processes and special materials instead of a pressure sensor and a touch sensor having different properties and can detect environmental effects without a separate sensor to prevent malfunction due to change in environment (temperature/humidity), and can reduce manufacturing costs.

10 Claims, 16 Drawing Sheets

(a)

(b)

(a)

(b)

(a)

(b)

PRESSURE TOUCH SENSING USING CONDUCTIVE PADS OF THE SAME PROPERTIES

TECHNICAL FIELD

The present invention generally relates to an improved pressure touch sensing method and device, and more particularly to an improved pressure touch sensing method and device that can sense touch and pressure using a plurality of conductive pads having the same properties and not requiring separate machining processes and special materials, instead of a pressure sensor and a touch sensor having different properties, and can detect environmental effects without a separate sensor to prevent malfunction due to change in environment (temperature/humidity).

BACKGROUND

As a type of capacitive touch panel, a projected capacitive touch panel has an outer layer made of glass to provide a scratch resistant surface and is thus generally used in mobile devices.

The projected capacitive touch panel operates by sensing a change in electric field caused by proximity of a conductive object. A touched portion of the projected capacitive touch panel is typically determined using an array or grid of capacitance sensors. In general, although the projected capacitive touch panel can distinguish between a single-touch event and multi-touch events, the projected capacitive touch panel cannot detect pressure. As a result, the projective capacitive touch panel often fails to distinguish a relatively light tap from relatively heavy pressing. Touch panels capable of sensing a pressure provide additional information regarding a simple touch location to allow a user to interact with a device in a new way.

To address this problem, a pressure sensitive touch panel disclosed in Korean Patent Laid-open Publication No. 10-2018-0090292 (Aug. 10, 2018) includes a plurality of first input/output terminals for a projected capacitive touch panel and a plurality of second input/output terminals for a capacitive touch controller to perform detection using a piezoelectric element, and thus requires two structural sheets with different physical properties, causing increase in manufacturing costs due to a complex manufacturing process.

Referring to FIG. 1, conventionally, a non-conductor 20 is disposed between a pressure sensor 10 and a touch sensor 30, which have different properties and thus require separate machining processes and special materials, causing a problem of increase in manufacturing costs.

In addition, when foreign matter, such as water W, settles on the touch pad 30 and ground 35 around the touch pad 30, it is not easy to distinguish settling of conductive foreign matter, such as water, from a touch by a user hand, causing an error in recognition of settling of the foreign matter by sensing settling of the foreign matter as a user touch.

In addition, there is a problem in that capacitor characteristics can physically change and malfunction when an environment (temperature/humidity) changes.

SUMMARY

It is an object of the present invention to provide an improved pressure touch method and device that can detect pressure, proximity, and touch using a plurality of conductive pads having the same physical properties, can minimize an influence of water droplets settling on the conductive pads and a shield region on an actual user touch using a grounded shield region disposed around the conductive pads, and can detect environmental effects without a separate sensor to prevent malfunction due to change in environment (temperature/humidity).

In accordance with one aspect of the present invention, there is provided an improved touch sensing method, wherein a touch sensing device includes a sensor pad including a plurality of conductive pads stacked one above another to form different layers and a non-conductor interposed between the conductive pads, and a sensor IC connected to the plurality of conductive pads of the sensor pad and including a first touch sensor sensing proximity and touch, a second touch sensor sensing a pressure, and a touch shield portion converting the conductive pads and the shield pad into a shield region, the touch sensing method including: a first sensing step in which capacitance between an innermost conductive pad and a conductive pad disposed adjacent to the innermost conductive pad among the plurality of conductive pads is sensed by the second touch sensor of the sensor IC; and a second sensing step in which capacitance between an outermost conductive pad and a conductive pad disposed adjacent to the outermost conductive pad among the plurality of conductive pads is sensed by the first touch sensor of the sensor IC; wherein capacitance change due to pressure is sensed in the first sensing step, capacitance change due to external touch and proximity is sensed in the second sensing step, and when the capacitance change is sensed in both the first sensing step and the second sensing step, it is determined that touch by a user hand occurs.

The first sensing step and the second sensing step may be sequentially performed in any order, regardless of a sensing order; and when touch is sensed in both the first sensing step and the second sensing step, or in both the second sensing step and the first sensing step, the sensor IC may detect whether the touch by a user hand occurs.

The sensor IC may allow conductive pads disposed below the outermost conductive pad to operate in one of a shielded state, a ground (GND) state, and a disconnected state in the second sensing step to improve noise characteristics and sensitivity to capacitance change caused by external touch and proximity.

The touch sensing method may further include: a third sensing step in which the innermost conductive pad among the plurality of conductive pads is sensed through the second touch sensor, wherein capacitance change due to an environmental change is sensed in the third sensing step to reduce a change in sensitivity to external noise and touch. In the third sensing step, the sensor IC may change conductive pads other than the innermost conductive pad to the ground (GND) state to reduce a change in sensitivity to external noise and touch upon sensing of the innermost conductive pad.

In the second sensing step, upon sensing the capacitance change due to external touch and proximity, the touch shield portion of the sensor IC may output waveforms with the same phase to the shield pad and conductive pads other than a conductive pad for touch sensing to prevent malfunction due to conductive foreign matter by preventing generation of a potential difference therebetween.

In accordance with another aspect of the present invention, an improved pressure touch sensing device includes: a sensor pad including a plurality of conductive pads stacked one above another to form different layers and a non-conductor interposed between the conductive pads; and a sensor IC connected to the plurality of conductive pads of the sensor pad, the sensor IC including: a first touch sensor sensing capacitance of an outermost conductive pad among the plurality of conductive pads; a second touch sensor sensing capacitance between an innermost conductive pad and a conductive pad disposed adjacent to the innermost conductive pad among the plurality of conductive pads; and a touch shield portion converting the conductive pads or a shield pad into a shield region, wherein the sensor IC senses capacitance change due to pressure through the second touch sensor, senses capacitance change due to external touch and proximity through the first touch sensor, and determines whether a user touch occurs, when the capacitance change is sensed by both the first and second touch sensors.

When the second touch sensor senses the innermost conductive pad among the plurality of conductive pads, the sensor IC may change conductive pads other than the innermost conductive pad to a ground (GND) state to reduce a change in sensitivity to external noise and touch.

When the first touch sensor senses the outermost conductive pad among the plurality of conductive pads, the sensor IC may allow conductive pads disposed below the outermost conductive pad to operate in one of a shielded state, a ground (GND) state, and a disconnected state to improve noise characteristics and sensitivity to capacitance change due to external touch and proximity.

The shield pad may be disposed to surround the conductive pads; and when the first touch sensor senses capacitance change due to external touch and proximity, the touch shield portion of the sensor IC may output waveforms with the same phase to the shield pad and conductive pads other than the conductive pad for touch sensing to prevent generation of a potential difference therebetween, thereby preventing malfunction due to conductive foreign matter.

The technical problems to be solved by the present invention are not limited to the above technical problems and other technical problems not mentioned will become apparent to a person having ordinary knowledge in the art from the detailed description.

As described above, the pressure touch sensing device and method according to the present invention can detect pressure, proximity, and touch using a plurality of conductive pads having the same physical properties, and may provide a grounded shield region around the conductive pads to minimize an influence of water droplets settling on the conductive pads and the shield region on an actual user touch.

In addition, the pressure touch sensing device and method according to the present invention can detect environmental effects through the conductive pads having the same physical properties without a separate sensor, thereby preventing malfunction due to change in environment (temperature/humidity) while reducing manufacturing costs.

BRIEF DESCRIPTION OF THE DRAWINGS

The accompanying drawings are intended to provide a better understanding of the invention and provide exemplary embodiments of the present invention with a detailed description. However, it should be understood that the technical features of the invention are not limited to any particular drawing and the features illustrated in each drawing may be combined with each other to form new embodiments.

DETAILED DESCRIPTION OF EMBODIMENTS

Figure 1:
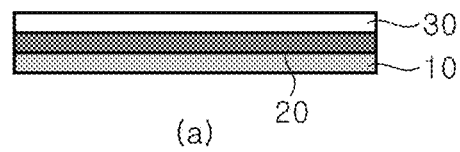
FIG. 1 is views of a pressure sensor and a touch sensor in the art.
Figure 1:
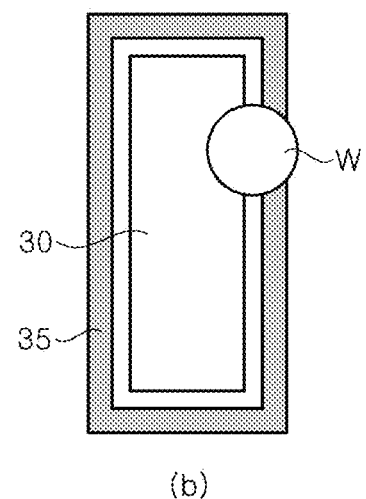
Figure 2:
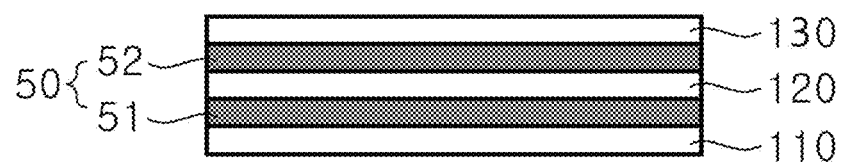
FIG. 2 is views of an improved pressure touch sensing device according to the present invention that includes a plurality of conductive pads having the same properties and stacked one above another.
Figure 2:
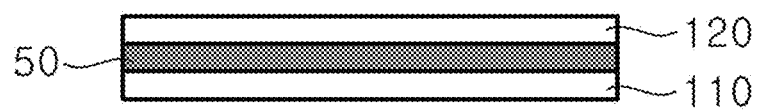

Hereinafter, exemplary embodiments of the present invention will be described in detail with reference to the accompanying drawings.

The above and other aspects, features, and advantages of the present invention will become apparent from the detailed description of the following embodiments in conjunction with the accompanying drawings.

However, it should be understood that the present invention is not limited to the embodiments disclosed below and can be realized in various ways and that the following embodiments are provided for complete disclosure and thorough understanding of the present invention by those skilled in the art and the scope of the invention should be defined by the claims.

In the drawings, a detailed description of components that can obscure the subject matter of to the invention will be omitted for clarity.

The features disclosed in each drawing may be combined with each other to form new embodiments.

Referring now to FIG. 2 to FIG. 17, an improved pressure touch sensing method and device according to the present invention may sense proximity, touch, and pressure using a plurality of conductive pads having the same properties instead of using a pressure sensor and a touch sensor having different properties.

A sensor pad may include a plurality of conductive pads 110, 120, 130 stacked one above another to form different layers to form different layers, and non-conductors 50 disposed between the conductive pads 110, 120, 130.

In addition, a sensor IC 200 may also include a first touch sensor 210 that senses proximity and touch, a second touch sensor 220 that detects pressure through capacitance, and a touch shield portion 250 that converts the conductive pads and a shield pad into a shielded region.

Referring to FIG. 2(a), a first conductive pad 110, a second conductive pad 120, and a third conductive pad 150 are stacked one above another, and the non-conductors 50 may be disposed between the first conductive pad 110 and the second conductive pad 120 and between the second conductive pad 120 and the third conductive pad 150, respectively.

Alternatively, as shown in FIG. 2(b), the second conductive pad 120 may be stacked on the first conductive pad 110 and the non-conductor 50 may be disposed between the first conductive pad 110 and the second conductive pad 120.

As shown in FIG. 2(a), the pressure touch sensing device may use three conductive pads, in which the first conductive pad 110 and the second conductive pad 120 may be used as pressure sensors and the third conductive pad 150 can be used as a proximity/touch detection sensor.

Alternatively, as shown in 2(b), the pressure touch sensing device may use two conductive pads, in which the first conductive pad 110 and the second conductive pad 120 may be used as pressure sensors and the second conductive pad 120 may be used as a proximity/touch detection sensor.

Here, since the first to third conductive pads have the same properties and a pressure sensor and a touch/proximity sensor with different properties are not required, the pressure touch sensing device does not require separate processes and special materials, thereby reducing manufacturing costs.

Figure 3:
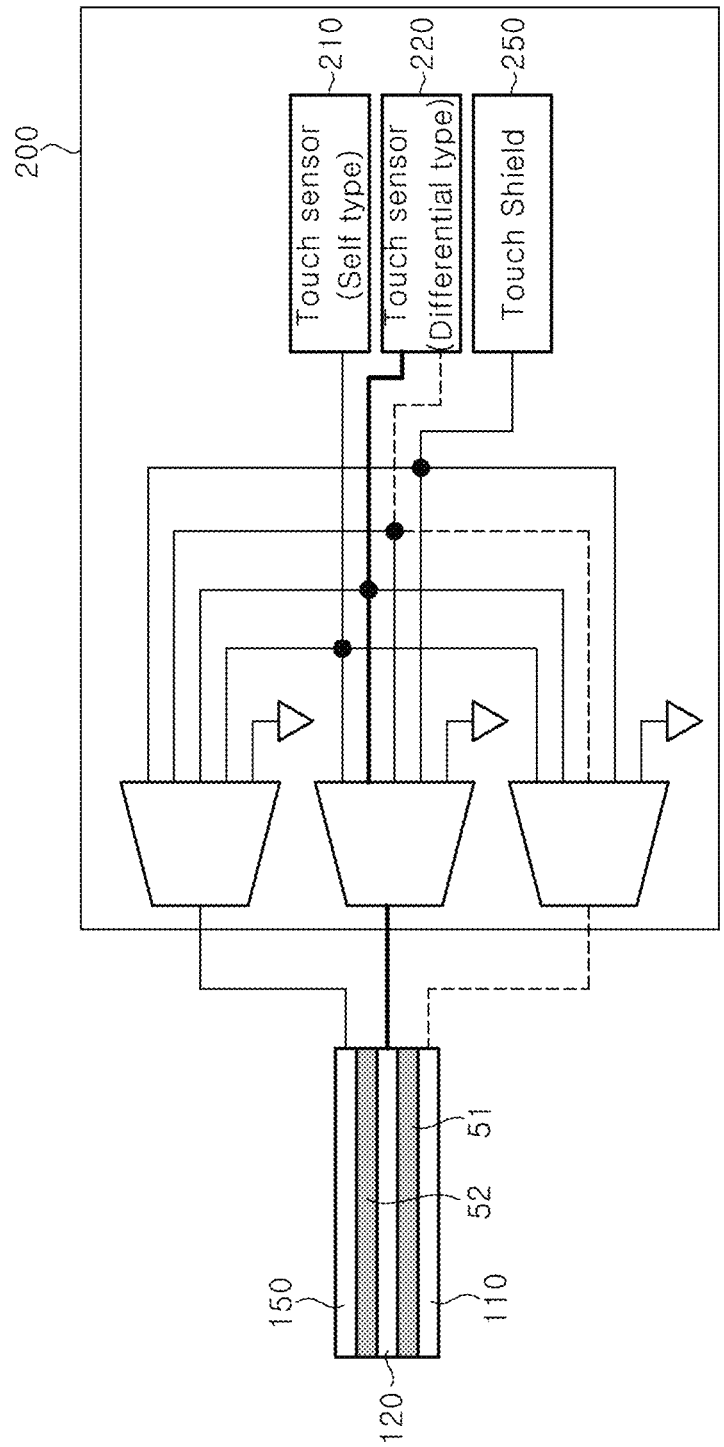
FIG. 3 is a view of an improved pressure touch sensing device according to a first embodiment of the present invention, illustrating a capacitance sensing operation.

More specifically, referring to FIG. 3, an improved pressure touch sensing device according to a first embodiment of the present invention includes a plurality of first to third conductive pads 110, 120, 150 stacked one above another to form different layers and non-conductors 51, 52 disposed between the conductive pads.

That is, the non-conductors 51, 52 may be disposed between the first conductive pad 110 and the second conductive pad 120 and between the second conductive pad 120 and the third conductive pad 150, respectively.

Further, the first to third conductive pads 110, 120, 150 may be connected to the sensor IC 200, which may include the first touch sensor 210, the second touch sensor 220, and the touch shield portion 250.

Further, when the multiple conductive pads are stacked one above another, the third conductive pad 150 closest to a device surface will be referred to as an outer layer pad and the first conductive pad 110 farthest from the device surface will be referred to as an inner layer pad.

In addition, each of the first to third conductive pads 110, 120, 150 may be connected to ground (GND), the first touch sensor 210, the second touch sensor 220, and the touch shield portion 250.

Further, the first touch sensor 210 of the sensor IC 200 is a self-type touch sensor and may sense whether the conductive pad is touched or not, and the second touch sensor 220 is a differential type touch sensor and may sense capacitance between the conductive pads. As shown in FIG. 3, the second touch sensor 220 may sense the capacitance between the first conductive pad 110 and the second conductive pad 120 and may compare a difference in capacitance therebetween to detect a pressure change.

In addition, the pressure touch sensing device according to this embodiment detects a pressure change through the second touch sensor 220 and senses proximity and touch with respect to the third conductive pad 150 through the first touch sensor 210.

As a result, the pressure touch sensing device according to this embodiment may detect a pressure change through the second touch sensor 220 and the first touch sensor 210, and only upon increase in sensitivity of both the first and second touch sensors 210, 220, the pressure touch sensing device may determine whether the pressure change is caused by a user touch.

Further, the pressure touch sensing device according to this embodiment may sense proximity and touch through the first touch sensor 210 and then detect a pressure change through the second touch sensor 220, or may sense proximity and touch through the second touch sensor 220 and then detect a pressure change through the first touch sensor 210, and it is necessary that sensitivity of both the first touch sensor 210 and the second touch sensor 220 be increased regardless of a sensing order of the first touch sensor 210 and the second touch sensor 220.

Therefore, upon increase in sensitivity in only one of the two sensors, the pressure touch sensing device according to this embodiment may determine that the touch is caused by foreign matter rather than a user hand.

In other words, when a user touches a conductive pad with his or her hand, the overall capacitance increases, and the pressure touch sensing device according to this embodiment may determine whether the user has touched the conductive pad with his or her hand by comparing a sensing value when the capacitance increases with a sensing value when the user does not touch the conductive pad.

The pressure touch sensing device according to this embodiment sequentially performs capacitance detection through sensing channels, in which a sensing channel not detecting capacitance outputs the same waveform as a shield channel.

The shield channel is activated while the sensing circuit sequentially determines whether a user touches a touch wheel pad.

Figure 4:
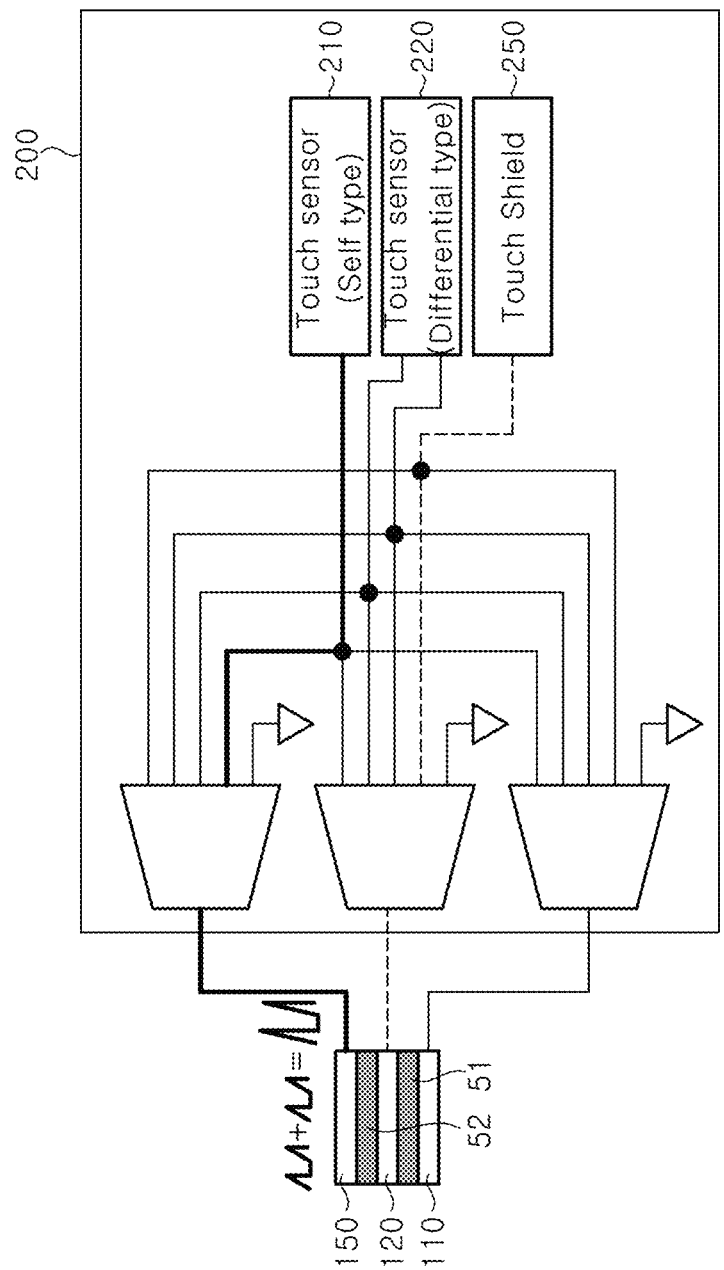
FIG. 4 to FIG. 6 are diagrams illustrating states of pads other than a sensed pad in the improved pressure touch sensing device according to the first embodiment of the present invention.
Figure 5:
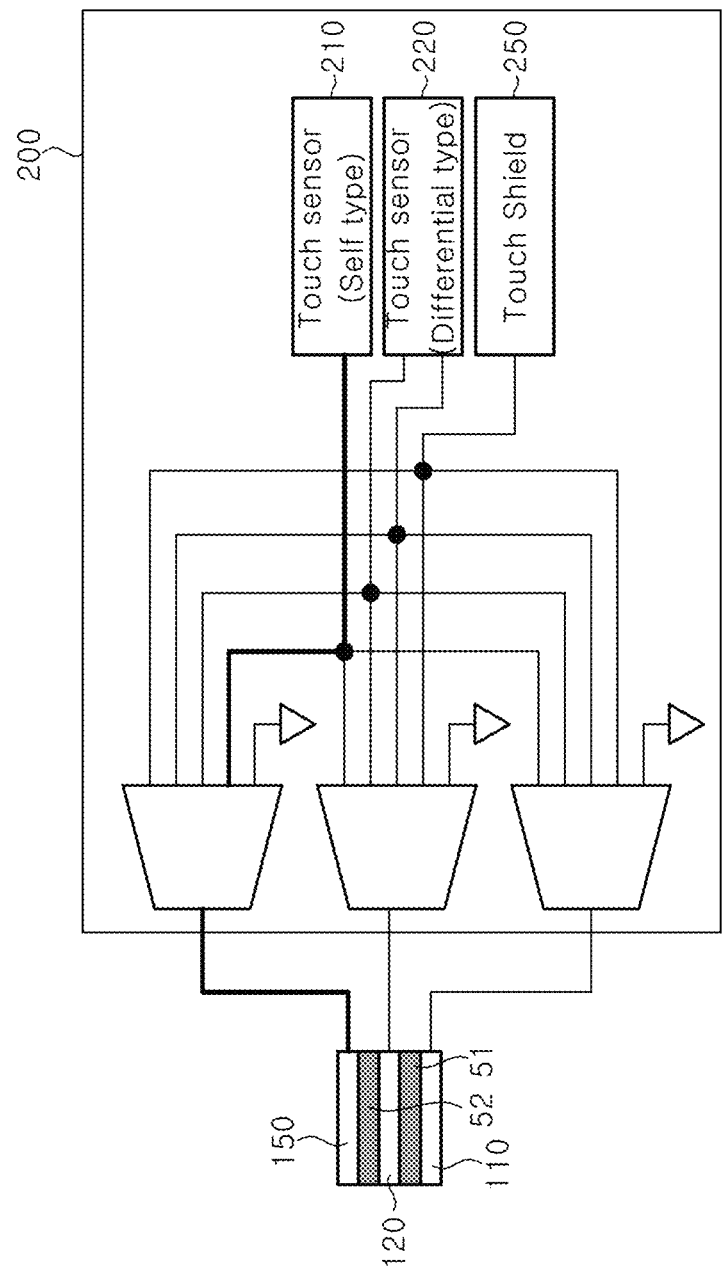
Figure 6:
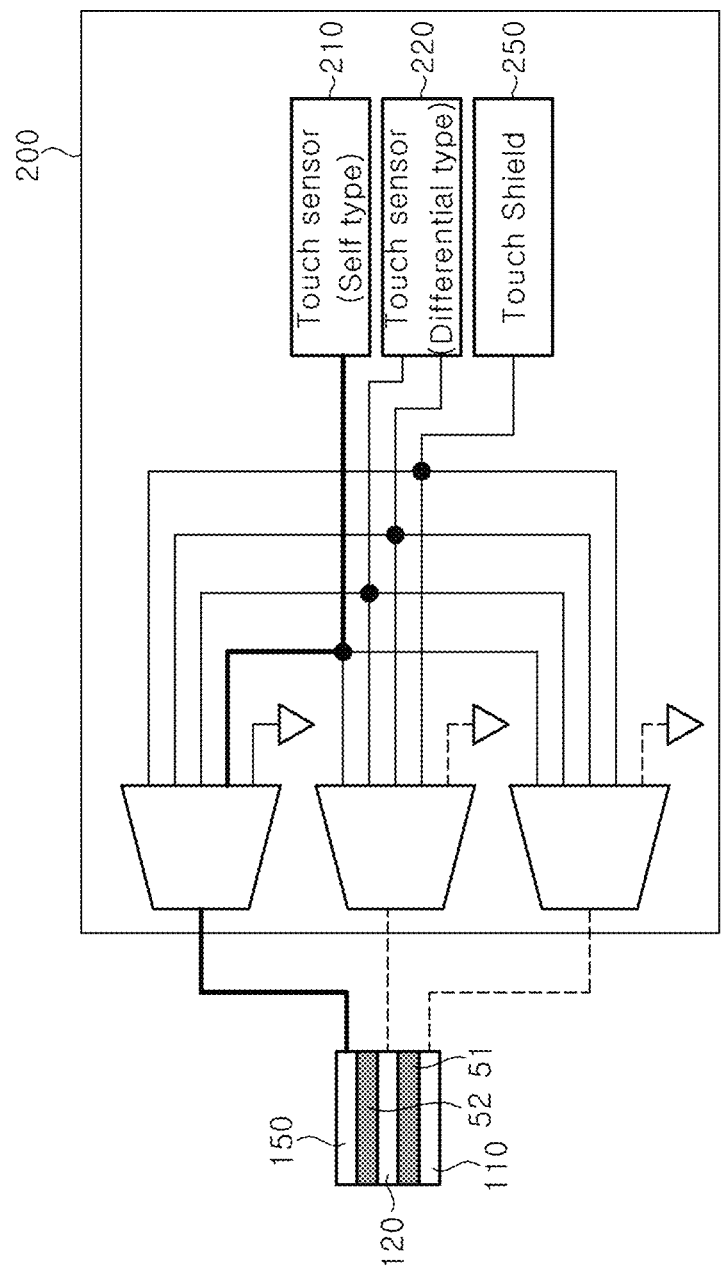

FIG. 4 to FIG. 6 show states of conductive pads other than a sensed conductive pad in the improved pressure touch sensing device according to the first embodiment of the present invention. In FIG. 4, while proximity and touch with respect to the third conductive pad 150 is sensed through the first touch sensor 210, the second conductive pad 120 is connected to the touch shield portion 250 such that the waveforms of the second conductive pad 120 and the third conductive pad 150 are superimposed with the same phase, thereby increasing sensing sensitivity.

Here, the first conductive pad 110 may also be connected to the touch shield portion 250 to further increase sensing sensitivity.

Referring to FIG. 5, the conductive pads 110, 120 other than the third conductive pad 150 sensed through the first touch sensor 210 are connected neither to ground (GND) nor the touch shield portion 250, thereby improving sensing sensitivity despite no protection against noise transferred from the second conductive pad 120 toward the third conductive pad 150.

Referring to FIG. 6, the conductive pads 110, 120 other the third conductive pad 150 sensed by the first touch sensor 210 are connected to ground (GND), thereby providing protection against noise transferred from the second conductive pad 120 toward the third conductive pad 150.

Thus, upon sensing touch through the first touch sensor 210 and the second touch sensor 220, the conductive pads other than the sensed conductive pad may take three different forms:

① Upon connection of the conductive pads other than the sensed conductive pad to the shield channel, the waveforms of the sensed conductive pad and the conductive pads disposed below the sensed conductive pad are superimposed with the same phase, thereby increasing sensing sensitivity thereof;

② Upon disconnection of the conductive pads other than the sensed conductive pad, it is possible to improve sensing sensitivity despite no protection against noise transferred towards the sensed conductive pad; and ③ Upon connection of the conductive pads other than the sensed conductive pad to ground (GND), it is possible to provide protection against noise transferred towards the sensed conductive pad.

In other words, depending on needs for sensing sensitivity and environments, the conductive pads other than the sensed conductive pad may be disconnected, may be connected to the shield channel to further increase sensing sensitivity, or may be connected to ground (GND) to provide protection against noise.

Figure 7:
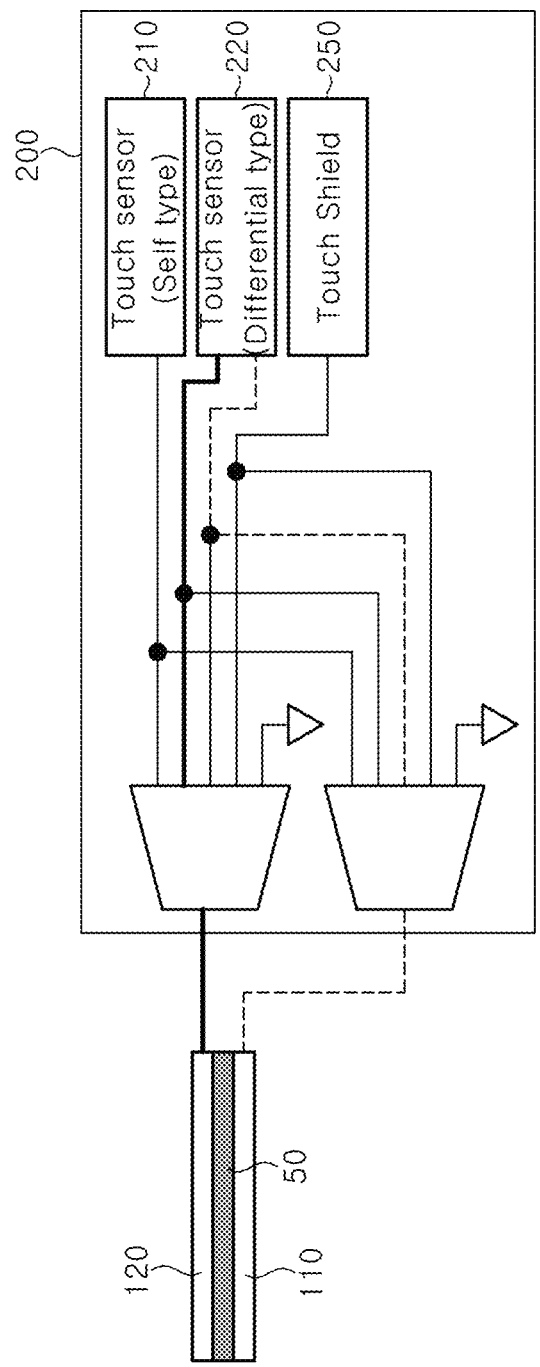
FIG. 7 is a view of an improved pressure touch sensing device according to a second embodiment of the present invention, illustrating a capacitance sensing operation.

FIG. 7 is a view of an improved pressure touch sensing device according to a second embodiment of the present invention, illustrating a capacitance sensing operation. Referring to FIG. 7, the pressure touch sensing device according to this embodiment includes a plurality of first and second conductive pads 110, 120 and a non-conductor 50 interposed between the conductive pads.

In this embodiment, the non-conductor 50 may be disposed between the first conductive pad 110 and the second conductive pad 120.

In addition, the first and second conductive pads 110, 120 are connected to a sensor IC 200, which may include a first touch sensor 210, a second touch sensor 220, and a touch shield portion 250.

Further, when the multiple conductive pads are stacked one above another, the second conductive pad 120 closest to a device surface will be referred to as an outer layer pad and the first conductive pad 110 farthest from the device surface will be referred to as an inner layer pad.

In addition, each of the first and second conductive pads 110, 120 may be connected to ground (GND), the first touch sensor 210, the second touch sensor 220, and the touch shield portion 250.

Further, the first touch sensor 210 of the sensor IC 200 is a self-type touch sensor and may sense whether the conductive pads are touched or not, and the second touch sensor 220 is a differential type touch sensor and may sense capacitance between the conductive pads.

That is, the second touch sensor 220 may sense the capacitance between the first conductive pad 110 and the second conductive pad 120 and may compare a difference in capacitance therebetween to detect a pressure change.

In addition, the pressure touch sensing device according to this embodiment detects a pressure change through the second touch sensor 220 and senses proximity and touch with respect to the second conductive pad 120 through the first touch sensor 210.

As a result, the pressure touch sensing device according to this embodiment may detect a pressure change through the second touch sensor 220 and the first touch sensor 210, and only upon increase in sensitivity of both the first and second touch sensors 210, 220, the pressure touch sensing device may determine whether the pressure change is caused by a user touch.

Figure 8:
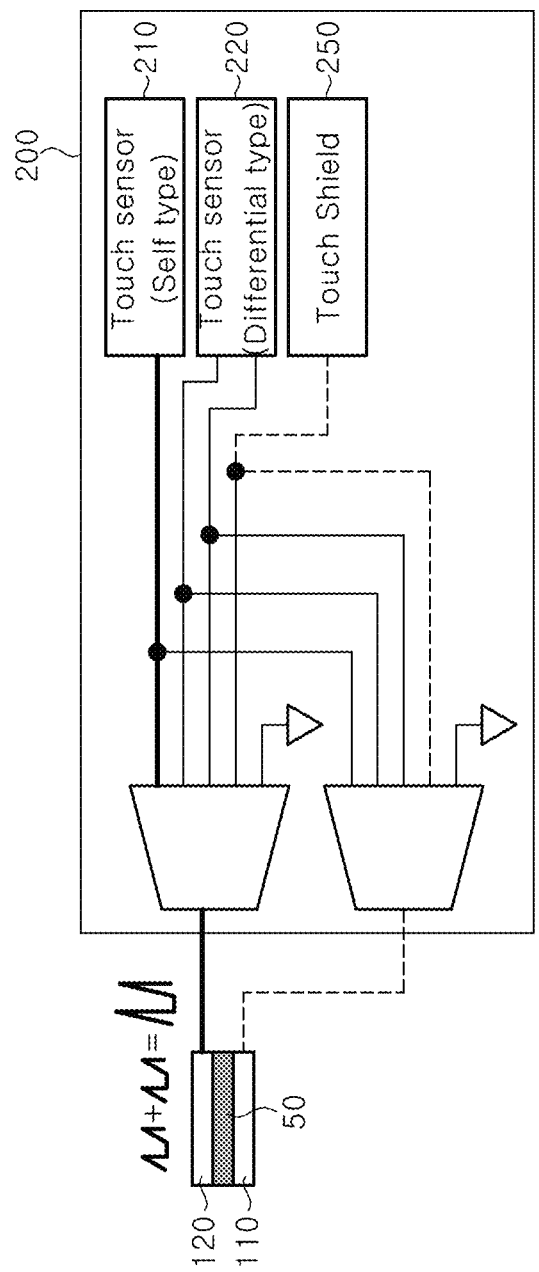
FIG. 8 to FIG. 10 are diagrams illustrating states of pads other than a sensed pad in the improved pressure touch sensing device according to the second embodiment of the present invention.
Figure 9:
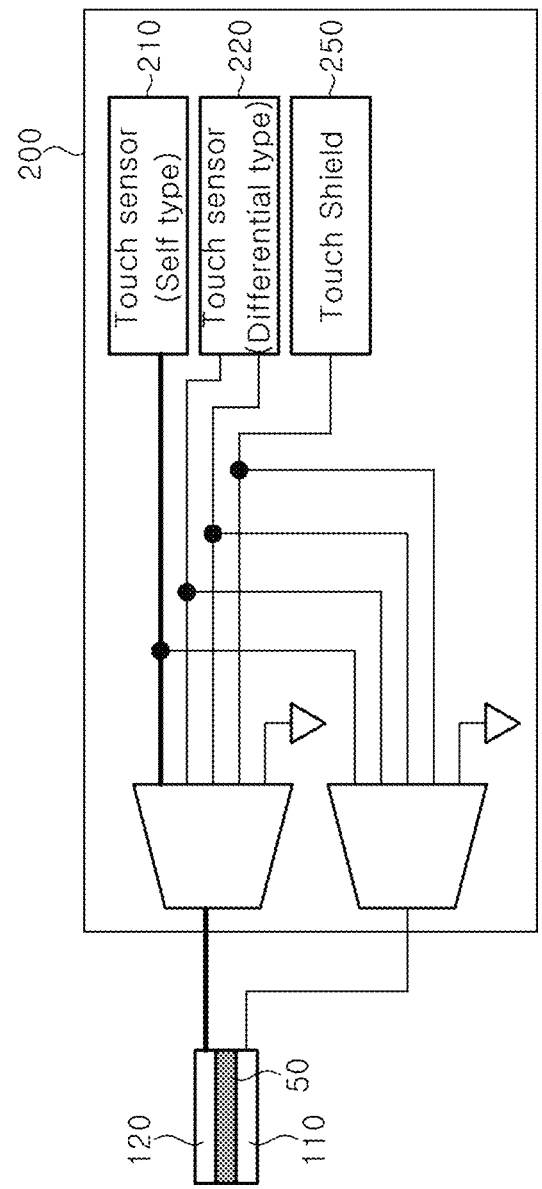
Figure 10:
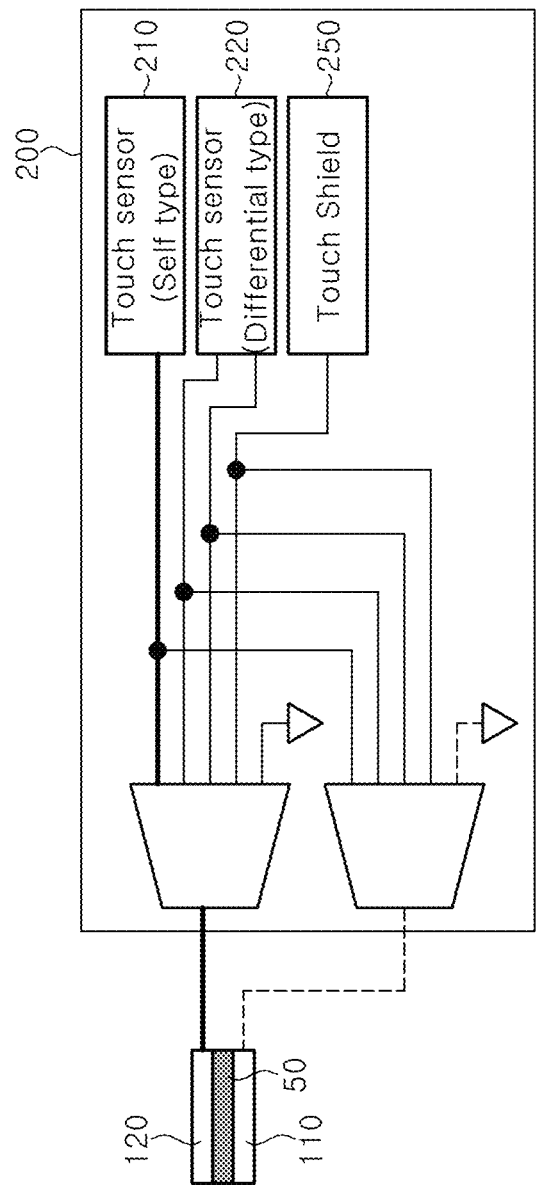

FIG. 8 to FIG. 10 show states of a conductive pad other than a sensed conductive pad in the improved pressure touch sensing device according to the second embodiment of the present invention. In FIG. 8, while proximity and touch with respect to the second conductive pad 120 is sensed through the first touch sensor 210, the first conductive pad 110 is connected to the touch shield portion 250 such that the waveforms of the first conductive pad 110 and the second conductive pad 120 are superimposed with the same phase, thereby increasing sensing sensitivity.

Referring to FIG. 9, the first conductive pad 110 other the second conductive pad 120 sensed by the first touch sensor 210 is connected neither to ground (GND) nor to the touch shield portion 250, thereby improving sensing sensitivity despite no protection against noise transferred from the first conductive pad 110 toward the second conductive pad 120.

Referring to FIG. 10, the first conductive pad 110 other the second conductive pad 120 sensed by the first touch sensor 210 is connected to ground (GND), thereby providing protection against noise transferred from the first conductive pad 110 toward the second conductive pad 120.

Thus, upon sensing touch through the first touch sensor 210 and the second touch sensor 220, the conductive pad other than the sensed conductive pad may take three different forms.

① Upon connection of the conductive pad other than the second conductive pad to the shield channel, the waveforms of the sensed conductive pad 120 and the first conductive pad 110 disposed below the sensed conductive pad 120 are superimposed with the same phase, thereby increasing sensitivity thereof;

② Upon disconnection of the conductive pad other than the sensed conductive pad, it is possible to improve sensing sensitivity despite no protection against noise transferred towards the sensed conductive pad; and ③ Upon connection of the conductive pad other than the sensed conductive pad to ground (GND), it is possible to provide protection against noise transferred towards the sensed conductive pad.

In other words, depending on needs for sensing sensitivity and environments, the conductive pad other than the sensed conductive pad may be disconnected, may be connected to the shield channel to further increase sensing sensitivity, or may be connected to ground (GND) to provide against noise.

Figure 11:
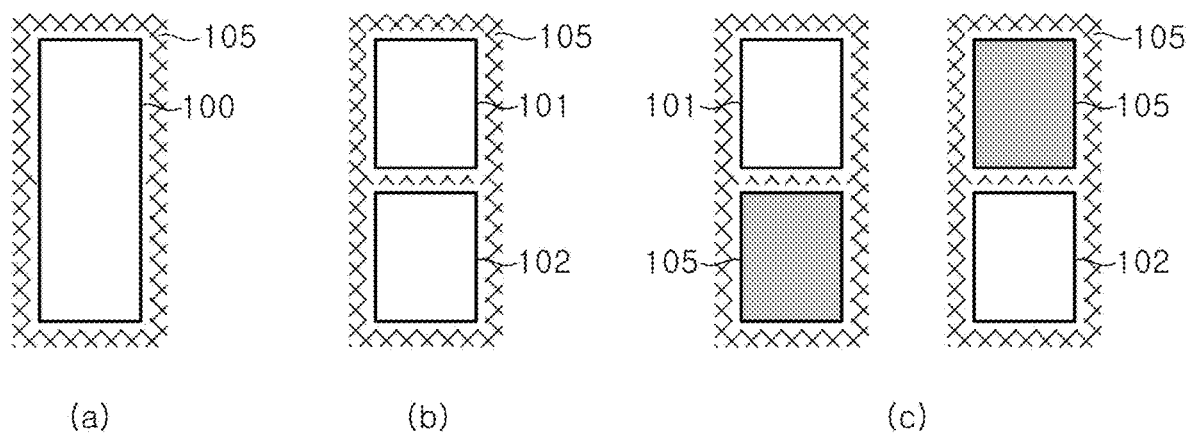
FIG. 11 is diagrams illustrating a method of preventing water-induced malfunction of the improved pressure touch sensing device according to the present invention.

FIG. 11 is diagrams illustrating a method of preventing water-induced malfunction of the improved pressure touch sensing device according to the present invention, in which a shield channel is used to prevent the water-induced malfunction.

That is, the pressure touch sensing device ensures that the waveforms with the same phase are output to the shield pad 105 and the touch pad 100 to prevent a potential difference therebetween, thereby preventing malfunction due to conductive foreign matter, such as water and the like.

FIG. 11(a) shows a conductive pad for proximity and touch detection according to a first embodiment of the present invention, FIG. 11(b) shows a conductive pad for proximity and touch detection according to a second embodiment of the present invention, and FIG. 11(c) is a diagram illustrating the use of a shield channel in the second embodiment.

As shown in FIG. 11(c), the channel shield may be used to prevent water-induced malfunction even with multiple channels configured to sense touch.

The shield pad 105 may be disposed around the conductive pad 100 for touch sensing to surround the conductive pad 100 and waveforms with the same phase may be output to the shield pad 105 and/or the conductive pad 100 to prevent generation of a potential difference therebetween, thereby preventing malfunction. This structure may also be applied to a structure in which the conductive pad is composed of a plurality of conductive pads 101, 102.

In addition, the conductive pad other than the conductive pad for touch sensing may have three different states.

Upon connection of the conductive pad other than the sensed conductive pad to the touch shield portion 250, the waveforms of the conductive pad for touch sensing and the conductive pad disposed below the sensed conductive pad are superimposed with the same phase to increase sensitivity of the conductive pads.

Further, disconnection of the conductive pad other than the sensed conductive pad can provide improvement in sensing sensitivity despite no protection against noise transferred towards the sensed conductive pad, and connection of the conductive pads other than the sensed conductive pad to ground (GND) can provide protection against noise transferred towards the sensed conductive pad.

Accordingly, the pressure touch sensing device according to the present invention makes the waveforms of the conductive pads and the shield pad identical, thereby minimizing a possibility that settling of a water droplet is sensed as a user touch.

Figure 12:
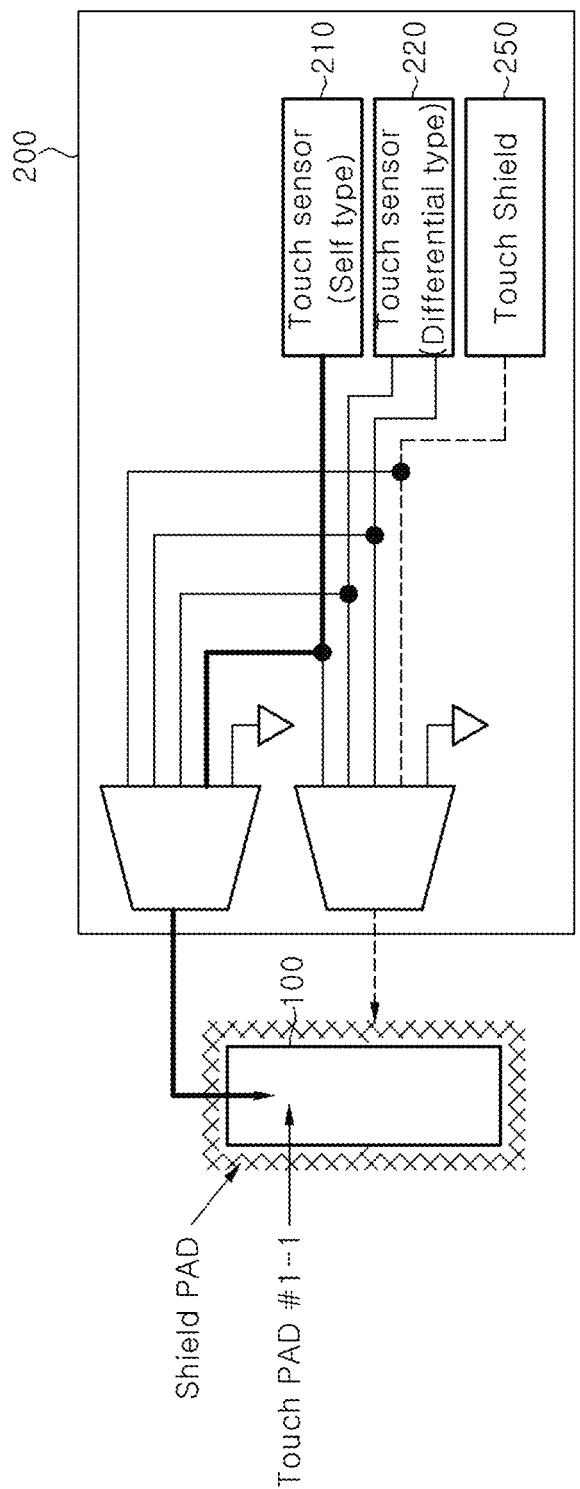
FIG. 12 is a diagram illustrating a first embodiment of a method of preventing water-induced malfunction of the improved pressure touch sensing device according to the present invention through a shield channel.

FIG. 12 is a diagram illustrating a first embodiment of a method of preventing water-induced malfunction of the improved pressure touch sensing device according to the present invention, in which a shield channel is used to prevent a malfunction due to conductive foreign matter, such as water.

The pressure touch sensing device according to the present invention prevents malfunction by outputting waveforms with the same phase to the shield pad 105 and the conductive pad 100 through the touch shield portion 250 to prevent generation of a potential difference therebetween.

Figure 13:
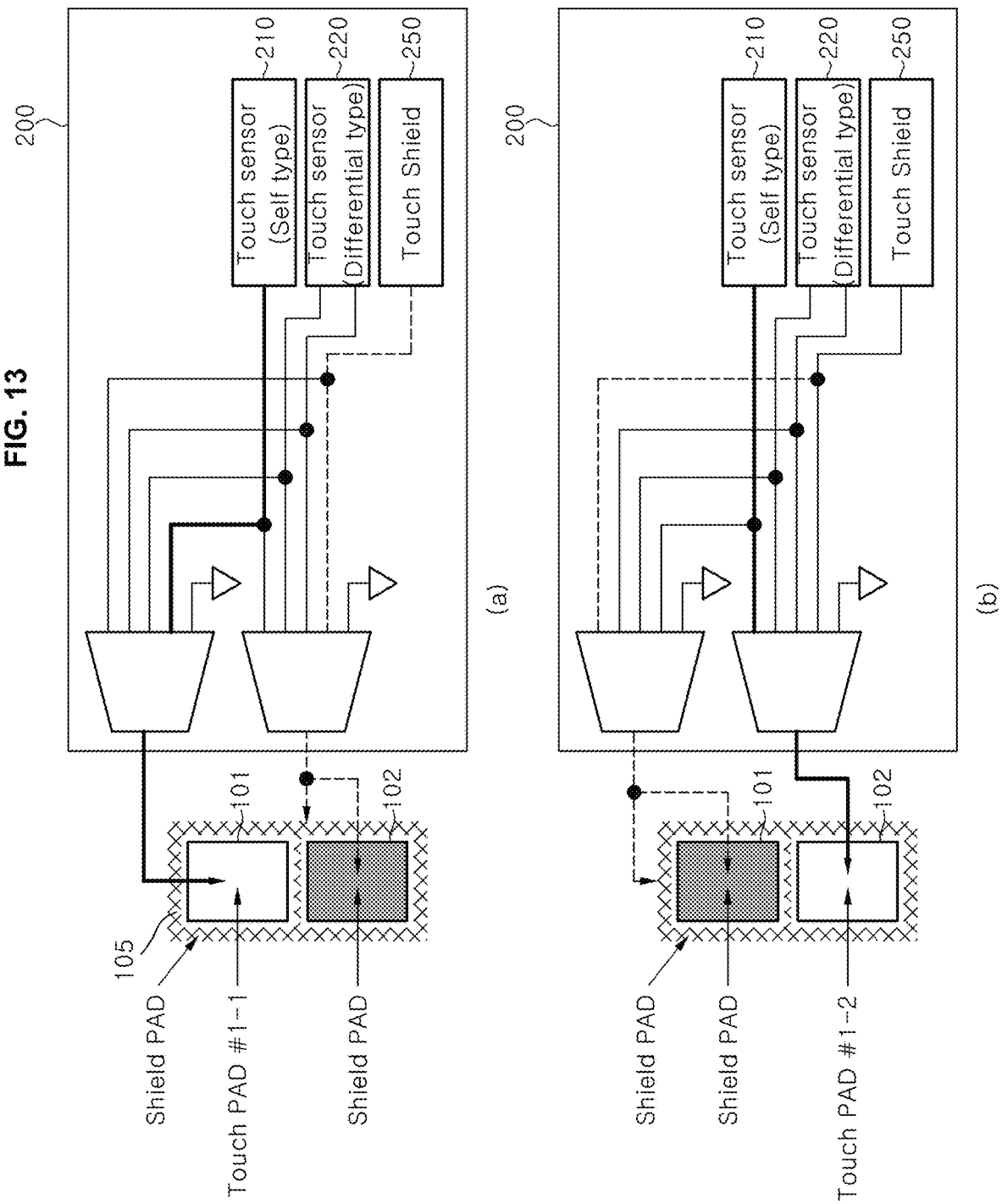
FIG. 13 is a diagram illustrating a second embodiment of a method of preventing water-induced malfunction of the improved pressure touch sensing device according to the present invention through a shield channel.

FIG. 13 is a diagram illustrating a second embodiment of a method of preventing water-induced malfunction of the improved pressure touch sensing device according to the present invention through a shield channel, in which a conductive pad 100 is divided into two channels and waveforms with the same phase are output to the shield pad 105 and the conductive pad 100 through the touch shield portion 250 using the shield pad to prevent generation of a potential difference between the two pads, thereby preventing malfunction due to conductive foreign matter, such as water.

Referring to FIG. 13(a), when a conductive pad for touch sensing is divided into two channels, the waveforms with the same phase may be output to the shield pad 105 and the conductive pad 102 other than the conductive pad 101 for touch sensing through the first touch sensor 210 to prevent generation of a potential difference therebetween, and, as shown in FIG. 13(b), the waveforms with the same phase may be output to the shield pad 105 and the conductive pad 102 other than the conductive pad 101 for touch sensing through the first touch sensor 210 to prevent generation of a potential difference therebetween, thereby preventing malfunction of the pressure touch sensing device.

Figure 14:
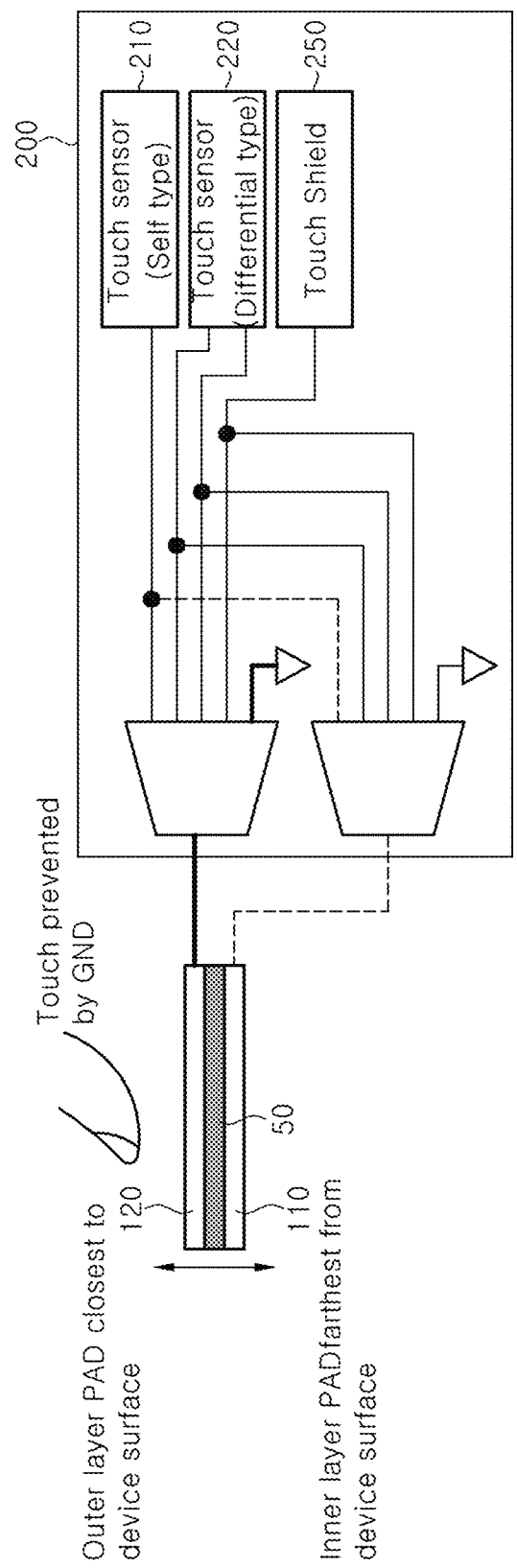
FIG. 14 is a diagram illustrating a method of preventing environmental change-induced malfunction of the improved pressure touch sensing device according to the present invention.

FIG. 14 is a diagram illustrating a method of preventing environmental change-induced malfunction of the improved pressure touch sensing device according to the present invention, in which the improved pressure touch sensing device prevents malfunction due to a change in capacitor characteristics upon change in environments (temperature/humidity). That is, the outer conductive pad 120 closest to the device surface may be changed to the ground (GND) state to block sensitivity with respect to external noise and touch, and the inner conductive pad 110 may be sensed as a reference (Ref) channel to check the value of the conductive pad changed by environmental factors (temperature/humidity).

That is, the pressure touch sensing device according to the present invention may respond to an environmental change using the first conductive pad 110, which is an inner conductive pad, as a reference channel.

With this structure, the pressure touch sensing device according to the present invention uses a conductive pad for measuring pressure without a separate typical sensor, thereby securing economic feasibility.

Figure 15:
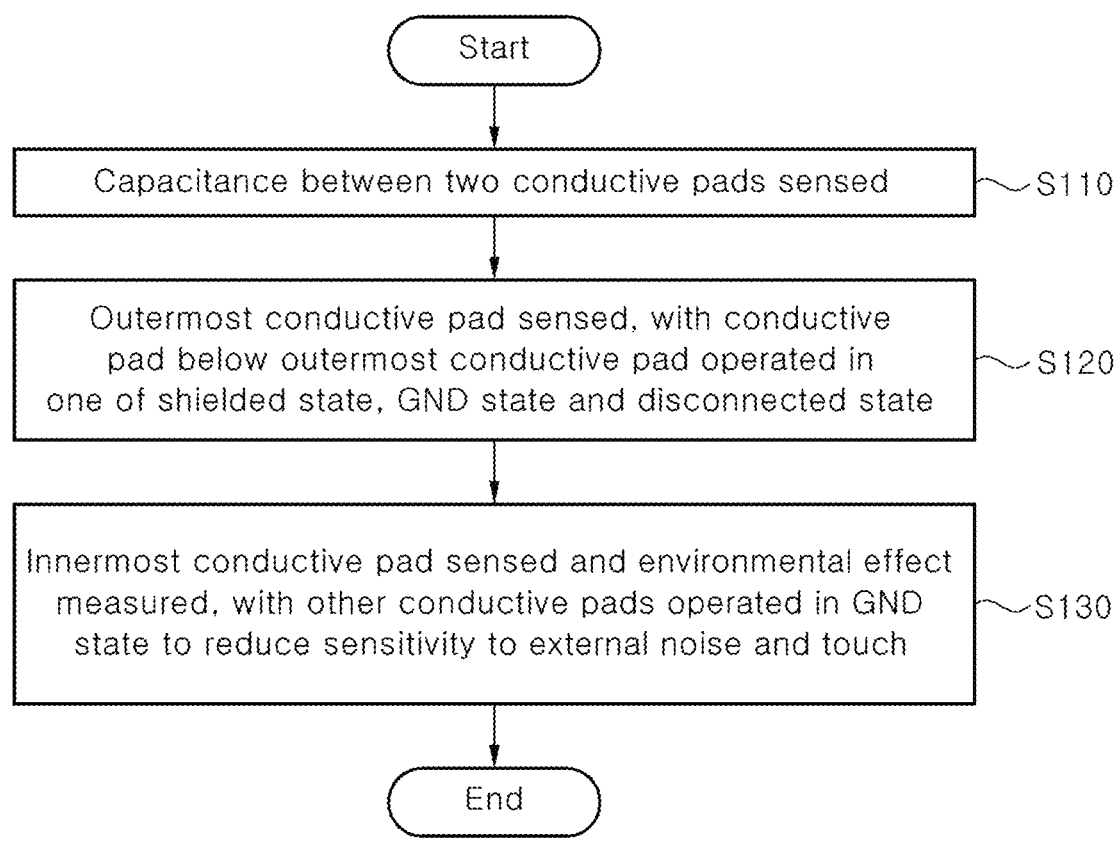
FIG. 15 is a flowchart illustrating an improved pressure touch method according to the present invention.

FIG. 15 is a diagram illustrating an improved pressure touch method according to the present invention. Referring to FIG. 15, the method according to the present invention uses a sensor pad including a plurality of conductive pads stacked in different layers and a non-conductor disposed between the conductive pads, and includes a first sensing step S100 in which capacitance between an innermost conductive pad and a conductive pad disposed adjacent to the innermost conductive pad among the plurality of conductive pads is sensed, and a second sensing step S120 in which capacitance between an outermost conductive pad and a conductive pad disposed adjacent to the outermost conductive pad among the plurality of conductive pads is sensed, wherein capacitance change due to pressure is sensed in the first sensing step S110, capacitance change due to external touch and proximity is sensed in the second sensing step S120, and it is determined that touch by a user hand occurs, when the capacitance change is sensed in both the first sensing step S110 and the second sensing steps S120.

The touch sensing method may further include: a third sensing step S130 in which the innermost conductive pad among the plurality of conductive pads is sensed, wherein capacitance change due to an environmental change is sensed in the third sensing step S130 to reduce a change in sensitivity to external noise and touch.

In the second sensing step S120, conductive pads disposed below the outermost conductive pad may be operated in one of a shielded state, a ground (GND) state, and a disconnected state to adjust sensitivity to capacitance change caused by external touch and proximity.

In the third sensing step S130, conductive pads other than the innermost conductive pad may be changed to the ground (GND) state to reduce a change in sensitivity to external noise and touch upon sensing of the innermost conductive pad.

Figure 16:
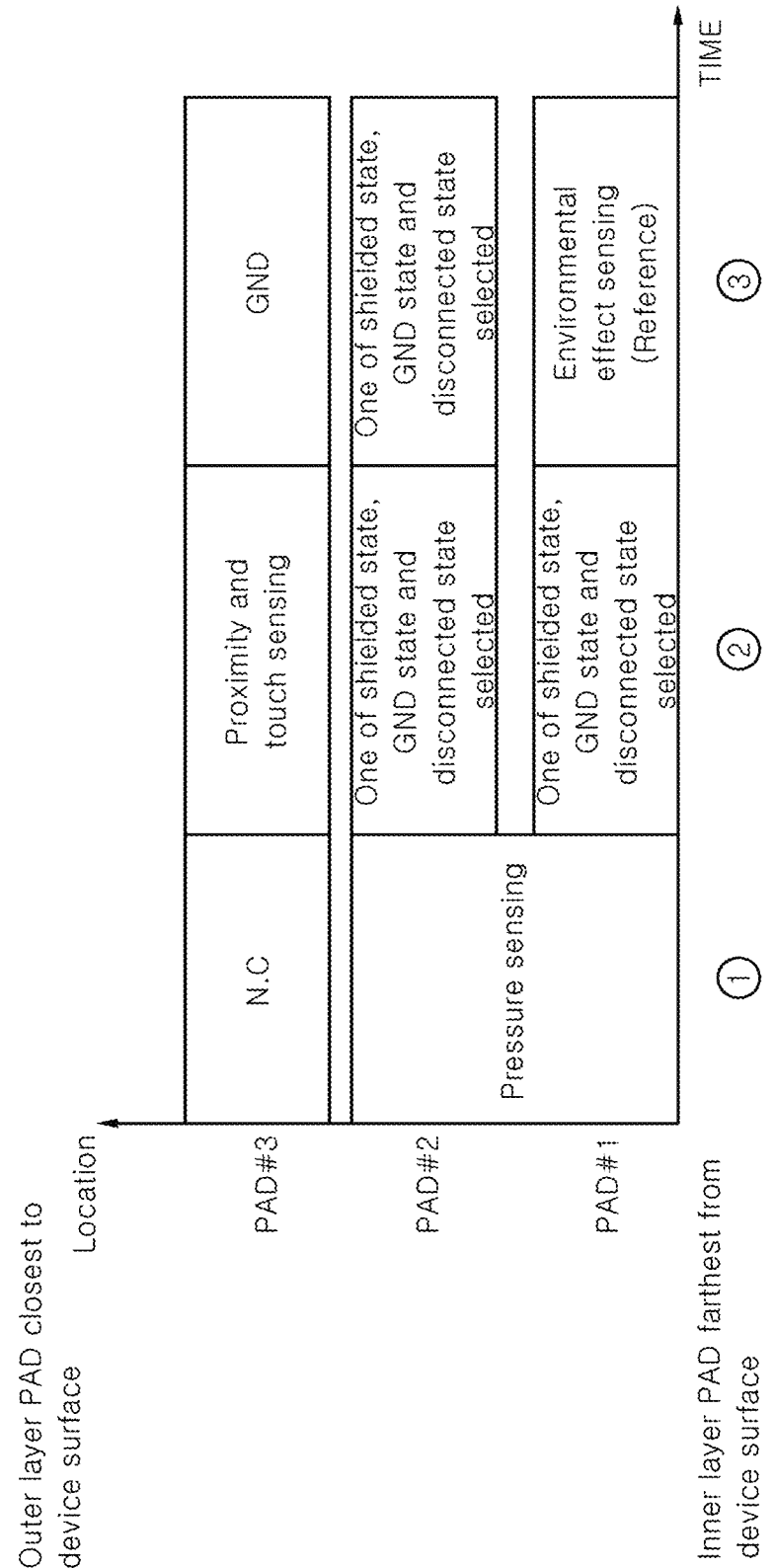
FIG. 16 is a diagram illustrating states of a conductive pad sensed over time in an improved pressure touch method according to a first embodiment of the present invention.
Figure 17:
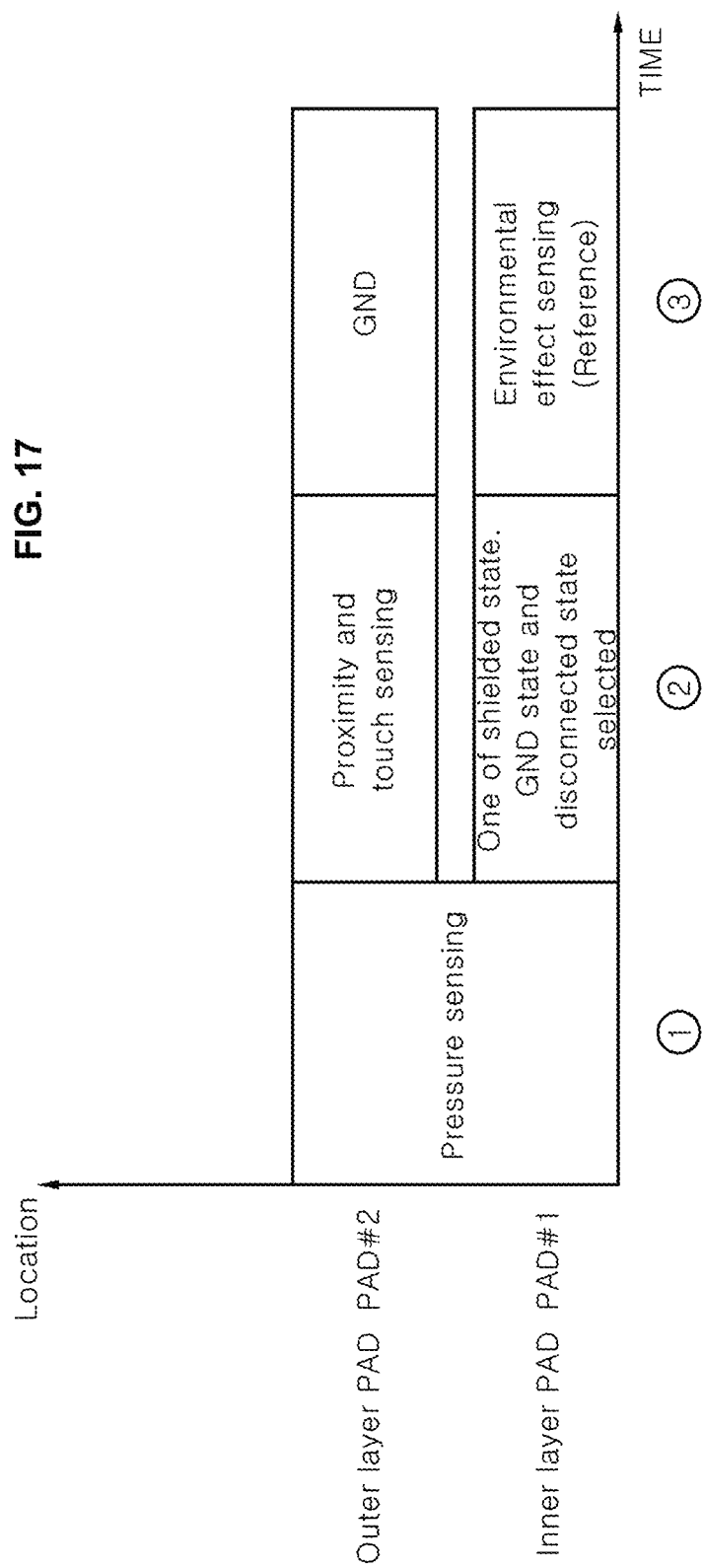
FIG. 17 is a diagram illustrating states of a conductive pad sensed over time in an improved pressure touch method according to a second embodiment of the present invention.

FIG. 16 is a diagram illustrating states of a conductive pad sensed over time in an improved pressure touch method according to a first embodiment of the present invention and FIG. 17 is a diagram illustrating states of a conductive pad sensed over time in an improved pressure touch method according to a second embodiment of the present invention. Sensing items in the flowchart may be arranged in any order and pressure information may be obtained from any combination of 1, 2, and 3, as well as 1 and 2, or 1 and 3.

First, as shown in FIG. 16, capacitance of a second conductive pad 120 disposed adjacent to the innermost first conductive pad 110 for pressure sensing is sensed. Here, the third conductive pad 150 disposed in the outermost layer may be in a disconnected state.

In addition, when proximity and touch is sensed through the third conductive pad 150, the first and second conductive pads 110, 120 other than the sensed conductive pad may be operated in one of a shielded state, a disconnected state, and a ground (GND) state.

That is, any of the three states may be selected to adjust sensing sensitivity according to a sensing environment.

In addition, the first conductive pad 110 placed in the innermost layer may be used as a reference channel to sense an environmental influence, the third conductive pad 150 placed in the outermost layer may be connected to ground (GND), and the second conductive pad 120 may be operated in one of the shielded state, the disconnected state, and the ground (GND) state.

Further, as shown in FIG. 17, first, the capacitance of the second conductive pad 120 adjacent to the first conductive pad 110 placed in the innermost layer for pressure sensing is sensed.

Subsequently, when proximity and touch is sensed through the second conductive pad 120, the first conductive pad 110 other than the sensed second conductive pad 120 may be operated in one of the shielded state, the disconnected state and the ground (GND) state.

That is, any of the three states may be selected to adjust sensing sensitivity according to a sensing environment.

In addition, the first conductive pad 110 placed in the innermost layer may be used as a reference channel to sense an environmental influence and the second conductive pad 150 placed in the outermost layer may be connected to ground (GND) to measure an environmental influence.

As such, according to the present invention, the improved pressure touch method and device can detect pressure, proximity, and touch using a plurality of conductive pads having the same physical properties, and can minimize an influence of water droplets settling on the conductive pads and a shield region on an actual user touch using a grounded shield region around the conductive pads.

In addition, according to the present invention, the pressure touch sensing device and method can detect environmental effects through the conductive pads having the same physical properties without a separate sensor, thereby preventing malfunction due to change in environment (temperature/humidity) while reducing manufacturing costs.

Although some exemplary embodiments of the present invention have been described above, it should be understood that various modifications, variations, and alterations can be made by those skilled in the art without departing from the spirit and scope of the invention.

Therefore, the scope of the invention should not be limited to the above embodiments, but should be limited only by the accompanying claims and equivalents thereto.

In other words, the foregoing embodiments are provided by way of illustration only and are not limited in all respects, and the scope of the invention is defined by the claims rather than by the detailed description, and all modifications or variations derived from the claims and equivalents thereto are to be construed as being within the scope of the invention.

LIST OF REFERENCE NUMERALS

10: Pressure sensor 20: Non-conductor
30: Proximity and touch detection sensors 35: Ground (GND)
50: Non-conductor 55: Ground (GND)
100: Touch pad 101: First touch pad
102: Second touch pad 110: First conductive pad
120: Second conductive pad 150: Third conductive pad
200: Sensor ICs
210: First touch sensor (self type)
220: Second touch sensor (differential type)
250: Touch shield portion

The invention claimed is:

1. An improved pressure touch sensing method using a touch sensing device, the touch sensing device comprising: a sensor pad comprising a plurality of conductive pads stacked one above another to form different layers and a non-conductor interposed between the conductive pads; and a sensor IC connected to the plurality of conductive pads of the sensor pad and comprising a first touch sensor sensing proximity and touch, a second touch sensor sensing a pressure, and a touch shield portion converting the conductive pads and a shield pad into a shield region, the touch sensing method comprising:
a first sensing step in which capacitance between an innermost conductive pad and a conductive pad disposed adjacent to the innermost conductive pad among the plurality of conductive pads is sensed by the second touch sensor of the sensor IC; and
a second sensing step in which capacitance between an outermost conductive pad and a conductive pad disposed adjacent to the outermost conductive pad among the plurality of conductive pads is sensed by the first touch sensor of the sensor IC,
wherein the plurality of conductive pads are configured to have the same properties,
wherein capacitance change due to pressure is sensed in the first sensing step, capacitance change due to external touch and proximity is sensed in the second sensing step, and when the capacitance change is sensed in both the first sensing step and the second sensing step, it is determined that touch by a user hand occurs.

2. The improved pressure touch sensing method according to claim 1, wherein the first sensing step and the second sensing step are sequentially performed in any order, regardless of a sensing order; and when touch is sensed in both the first sensing step and the second sensing step or in both the second sensing step and the first sensing step, the sensor IC determines whether the touch by a user hand occurs.

3. The improved pressure touch sensing method according to claim 1, wherein the sensor IC allows conductive pads disposed below the outermost conductive pad to operate in one of a shielded state, a ground (GND) state, and a disconnected state in the second sensing step to improve noise characteristics and sensitivity to capacitance change caused by external touch and proximity.

4. The improved pressure touch sensing method according to claim 1, further comprising:
a third sensing step in which the innermost conductive pad among the plurality of conductive pads is sensed through the second touch sensor,
wherein capacitance change due to an environmental change is sensed in the third sensing step to reduce a change in sensitivity to external noise and touch.

5. The improved pressure touch sensing method according to claim 4, wherein, in the third sensing step, the sensor IC changes conductive pads other than the innermost conductive pad to the ground (GND) state to reduce a change in sensitivity to external noise and touch upon sensing of the innermost conductive pad.

6. The improved pressure touch sensing method according to claim 1, wherein, in the second sensing step, upon sensing the capacitance change due to external touch and proximity, the touch shield portion of the sensor IC outputs waveforms with the same phase to the shield pad and conductive pads other than a conductive pad for touch sensing to prevent malfunction due to conductive foreign matter by preventing generation of a potential difference therebetween.

7. An improved pressure touch sensing device comprising:
a sensor pad comprising a plurality of conductive pads stacked one above another to form different layers and a non-conductor interposed between the conductive pads; and
a sensor IC connected to the plurality of conductive pads of the sensor pad, the sensor IC comprising:
a first touch sensor sensing capacitance of an outermost conductive pad among the plurality of conductive pads;
a second touch sensor sensing capacitance between an innermost conductive pad and a conductive pad disposed adjacent to the innermost conductive pad among the plurality of conductive pads; and
a touch shield portion converting the conductive pads or a shield pad into a shield region,
wherein the plurality of conductive pads are configured to have the same properties,
wherein the sensor IC senses capacitance change due to pressure through the second touch sensor, senses capacitance change due to external touch and proximity through the first touch sensor, and determines whether a user touch occurs, when the capacitance change is sensed by both the first and second touch sensors.

8. The improved pressure touch sensing device according to claim 7, wherein, when the second touch sensor senses the innermost conductive pad among the plurality of conductive pads, the sensor IC changes conductive pads other than the innermost conductive pad to a ground (GND) state to reduce a change in sensitivity to external noise and touch.

9. The improved pressure touch sensing device according to claim 7, wherein, when the first touch sensor senses the outermost conductive pad among the plurality of conductive pads, the sensor IC allows conductive pads disposed below the outermost conductive pad to operate in one of a shielded state, a ground (GND) state, and a disconnected state to improve noise characteristics and sensitivity to capacitance change due to external touch and proximity.

10. The improved pressure touch sensing device according to claim 7, wherein the shield pad is disposed to surround the conductive pads; and when the first touch sensor senses capacitance change due to external touch and proximity, the touch shield portion of the sensor IC outputs waveforms with the same phase to the shield pad and conductive pads other than the conductive pad for touch sensing to prevent generation of a potential difference therebetween to prevent malfunction due to conductive foreign matter.

* * * * *